United States Patent [19]
Gordon

[11] Patent Number: 5,946,893
[45] Date of Patent: Sep. 7, 1999

[54] LAWN MOWER HAVING CUTTER DECK MOTION COUPLED TO MOWER WHEEL MOTION

[75] Inventor: Todd B. Gordon, Rome, N.Y.

[73] Assignee: Ferris Industries, Inc., Munnsville, N.Y.

[21] Appl. No.: 09/144,499

[22] Filed: Aug. 31, 1998

Related U.S. Application Data

[60] Provisional application No. 60/063,362, Oct. 28, 1997.

[51] Int. Cl.⁶ .................................................. A01D 34/03
[52] U.S. Cl. ............................................. 56/15.8; 56/15.7
[58] Field of Search ................................... 56/15.6, 15.7, 56/15.8, DIG. 22, DIG. 3, DIG. 10; 280/124.179, 124.136, 124.141

[56] References Cited

U.S. PATENT DOCUMENTS

| | | | |
|---|---|---|---|
| 2,482,216 | 9/1949 | Rust | 56/15.2 |
| 2,709,881 | 6/1955 | Goss | 56/15.7 |
| 2,859,578 | 11/1958 | Hall | 56/6 |
| 3,024,041 | 3/1962 | Maruhn | 280/124.109 |
| 3,159,959 | 12/1964 | Mathews | 56/218 |
| 3,696,594 | 10/1972 | Freimuth et al. | 56/15.2 |
| 3,913,696 | 10/1975 | Kennedy et al. | 180/11 |
| 3,940,161 | 2/1976 | Allison | 280/96.2 R |
| 4,159,613 | 7/1979 | Knudson et al. | 56/11.3 |
| 4,724,661 | 2/1988 | Blakeslee et al. | 56/208 |
| 4,843,804 | 7/1989 | Wellman | 56/16.4 |
| 4,957,307 | 9/1990 | Gandiglio | 280/666 |
| 5,129,218 | 7/1992 | Younberg et al. | 56/15.8 |
| 5,197,755 | 3/1993 | Quick | 280/690 |
| 5,355,664 | 10/1994 | Zenner | 56/15.8 |
| 5,367,864 | 11/1994 | Ogasawara et al. | 56/15.8 |
| 5,435,591 | 7/1995 | Lee | 280/673 |
| 5,765,858 | 6/1998 | Kawagoe et al. | 280/701 |

*Primary Examiner*—Thomas B. Will
*Assistant Examiner*—Arpad Fabian Kovacs
*Attorney, Agent, or Firm*—Brown, Pinnisi & Michaels, P.C.

[57] ABSTRACT

A riding lawn mower has wheels which are spring suspended from the chassis and a floating-type cutter deck hangs from the chassis. When a wheel moves upwardly relative to the chassis, as occurs when the wheel goes across a bump or when the chassis leans in a turn, a nearby portion of the cutter deck is lifted upwardly in response. In one embodiment, the drive wheels are independently spring suspended rear wheels and the cutter deck is mounted between the front and rear wheels. On each side of the machine a chain runs from a lifting bracket attached to each rear wheel motor mount and runs down to the rear end of the deck. So, when a wheel moves upwardly the deck is moved upwardly. In another embodiment, the front wheels are the spring suspended drive wheels and the cutter deck is cantilevered from the front end of the machine. The rear end of the cutter deck is lifted upwardly upon upward wheel motion.

10 Claims, 5 Drawing Sheets

LAWN MOWER HAVING CUTTER DECK MOTION COUPLED TO MOWER WHEEL MOTION

This application claims benefit of Provisional Patent Application Ser. No. 60/063362, filed on Oct. 28, 1997.

TECHNICAL FIELD

The present invention relates to lawn and garden machines, in particular, to lawn mowers of the self-propelled riding type.

BACKGROUND

The present invention is described with respect to its use on riding lawn mowers, particularly self-propelled machines fitted with rotating blades for cutting turf grasses. In the most favored typical design, the rider sits atop a three or four wheeled machine, while one or more blades rotate about a vertical axis within a mower deck mounted at the underside of the machine, to cut grasses as the machine moves across the surface being mowed.

In many typical riding mowers the cutter deck is configured so that it "floats". Typically, a deck is hung between the front and rear wheels and beneath the chassis by chains, links or other devices, so it is adapted to rise up when skids, wheels, rollers and the like attached to the deck underside contact the lawn surface. Generally, the intent for such deck suspension system is to avoid continuing contact with the earth surface; the distance of the cutter deck from the earth surface is determined by the elevation of the chassis. Only when the mower crosses an earth-surface rise which is relatively severe (that is, short in horizontal length compared to the wheel base of the mower and great in height compared to the pre-set elevation of the mower deck) is it expected that the deck will contact the earth surface. Then, it is intended that the deck will rise of "float" upwardly, so the rotary blades will not hit the earth surface. Such designs work well for many kinds of unevenness, but scalping for certain earth surfaces and mower movements is still a problem. And, even if there is no scalping, variation of the height of the cutter deck relative to the earth surface is not wanted, as it varies the height of the cut grass.

Many typical prior art mowers have the wheels rigidly attached to the chassis. Thus, unevenness in the earth surface imparts a lot of up and down chassis motion. Some prior art mowers employ center-pivoting axles which somewhat reduce the vertical motion of the chassis when one wheel encounters unevenness. In an improvement, a lawn mower is fitted with independently suspended wheels, as described in related patent application Ser. No. 09/119,818, discussed further in the Description. The related application describes a preferred transmission steerable mower which has rear drive wheels which are independently driven and spring suspended from the chassis; and, which has free pivoting caster front wheels, mounted at the outer ends of a pivotable axle or subframe. The deck is suspended between the front and rear wheels.

Mowers with improved spring suspension systems reduce the amount of chassis motion when one or both drive wheels of a mower encounter unevenness in the surface being mowed. Drive wheel traction is improved. However, depending on the particulars of any non-rigid suspension system, the chassis is enabled to roll relative to the earth surface; as, for example, when the mower is sharply turning or when the mower is traversing a steep hill side. When a mower rolls, a chassis suspended deck moves closer to the earth surface and there can be a tendency for scalping of the turf by the cutter deck. Thus, there is a need for improvement in the manner in which deck elevation is controlled, particularly for decks used on independent and non-independent spring suspension machines.

SUMMARY

An object of the invention is to reduce the tendency of the cutter deck of certain types of lawn mowers to scalp a lawn due to rolling of the mower chassis. A further object is to provide improved combination of mower wheel spring suspension system and cutter decks.

In accord with the invention, a lawn mower cutter deck is suspended from a mower chassis so that a portion thereof is lifted in response to the upward motion of a nearby wheel, relative to the chassis. More particularly, a mower has opposing wheel assemblies at the front or rear, or both ends, which wheel assemblies comprise wheels which are spring suspended from the chassis. In one embodiment, one end of the cutter deck is suspended by chains or other like suspenders from the chassis; the other end is suspended from lifting brackets which are integral with the wheel mounts of the spring suspended wheel assemblies. In another embodiment, both front and rear ends of the cutter deck are suspended from the chassis. Suspenders run from brackets attached to the wheel assemblies, superceding the support of the front or rear suspenders, and lifting the cutter deck with upward wheel motion.

In one type of mower to which the invention is applied, the cutter deck is suspended between the front and rear wheels. The front wheels are freely pivotable caster wheels, mounted at outer ends of a transverse pivotable member, preferably a pivoting subframe. The rear wheels are independently suspended, and independently driven to steer the mower. In another type of mower to which the invention is applied, the front wheels are independently suspended and driven by a transmission. The rear wheels are steerable. The cutter deck is mounted beneath a cantilever subframe at the front end of the mower. The front end of the deck is suspended from the subframe. The opposing sides of the rear end of the deck are connected with the front wheel assemblies by suspenders, so the rear end of the deck moves upwardly with upward motion of the front wheels relative to the chassis.

The foregoing and other objects, features and advantages of the invention will become more apparent from the following description of the best mode of the invention and accompanying drawings.

DESCRIPTION

The invention is generally applicable to mowers with wheels that are suspended from a chassis so they can move up and down. It is principally described in terms of its application to a 4-wheel transmission steerable mowing machine, particularly one having an independent drive wheel suspension system described in detail in the commonly owned patent application "Lawn Mower Having Independent Suspension" of Todd B. Gordon, Ser. No. 09/119,818, filed on Jul. 21, 1998 herewith. The Summary and Description thereof are hereby incorporated by reference. The preferred embodiment lawn mower 18 of the first portion of the description herein is like the preferred mower described in the patent application. It has drive wheel assemblies which are independently spring-suspended from the chassis, and the rear wheels are independently driven, to control the travel direction of the mower.

Figure 1:
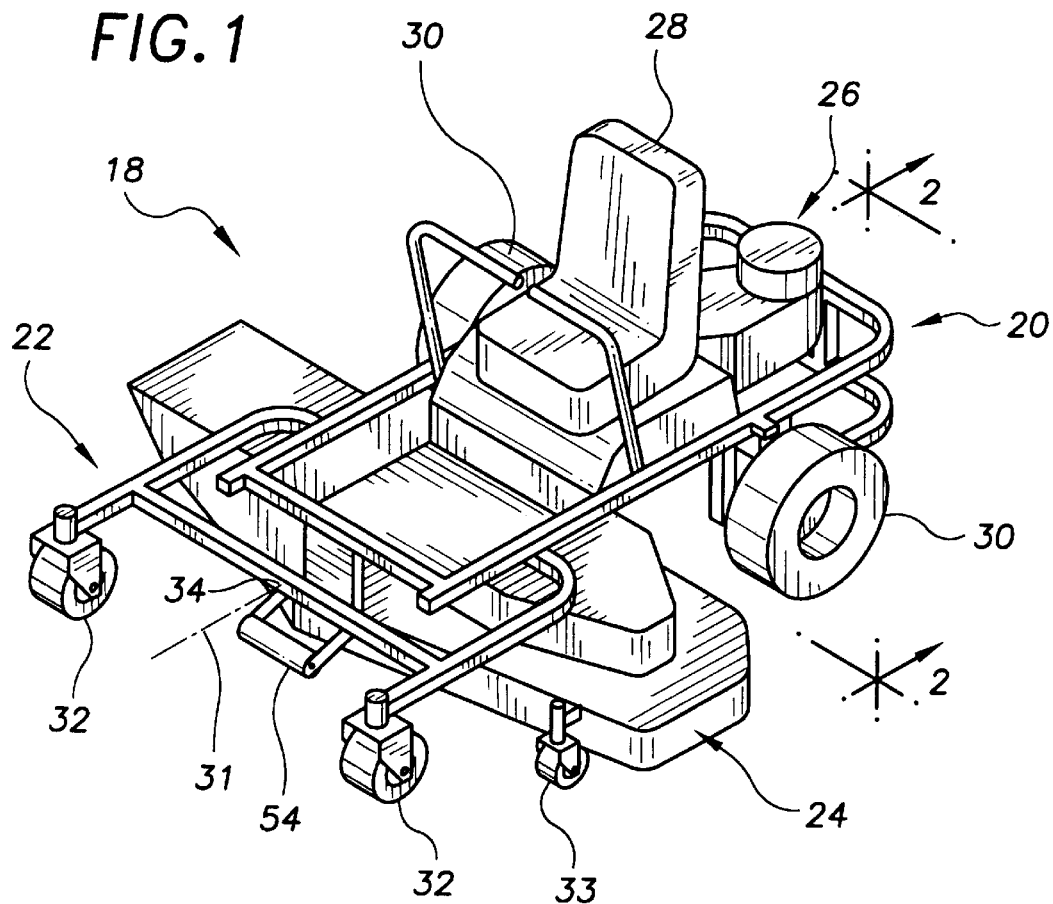
FIG. 1 is a semi-schematic perspective view of a lawn mower having a cutter deck and pivoting front wheel subchassis.

FIG. 1 semi-schematically shows such a preferred riding lawn mower 18. The mower is comprised of a chassis 20 which carries a prime mover 26, such as an internal combustion engine driving a hydraulic pump, an operator seat 28, and a cutter deck 24. Separately controlled hydraulic motors independently turn each rear wheel. Rear drive wheels 30 are suspended from opposing sides of the rear end of the chassis. The mower operator sits on the operator seat 28, atop the chassis and just forward of the prime mover.

The front end of the chassis is comprised of a subframe (or subchassis) 22 attached at two spaced apart pivot points, so the subframe pivots about a longitudinal centerline 31 of the mower. Two free-pivoting front caster wheels 32 are attached on opposing sides of the front end of the subframe. A pivoting subframe is described in the patent application "Riding Mower with Pivoting Front Wheel Assembly", of Todd B. Gordon, Ser. No. 08/898,801, filed Jul. 23, 1997, having common inventor and assignee herewith. The portions of the Description which relate to and include FIGS. 1–7 thereof are hereby incorporated by reference. A pivoting axle, mounted on the chassis at point 34, may alternately be used. A pivoting front member minimizes twisting and lifting of one side of the chassis which otherwise would occur when one front wheel rises or falls. However, as a corollary, such pivoting transverse members also allow the chassis to roll.

Figure 2:
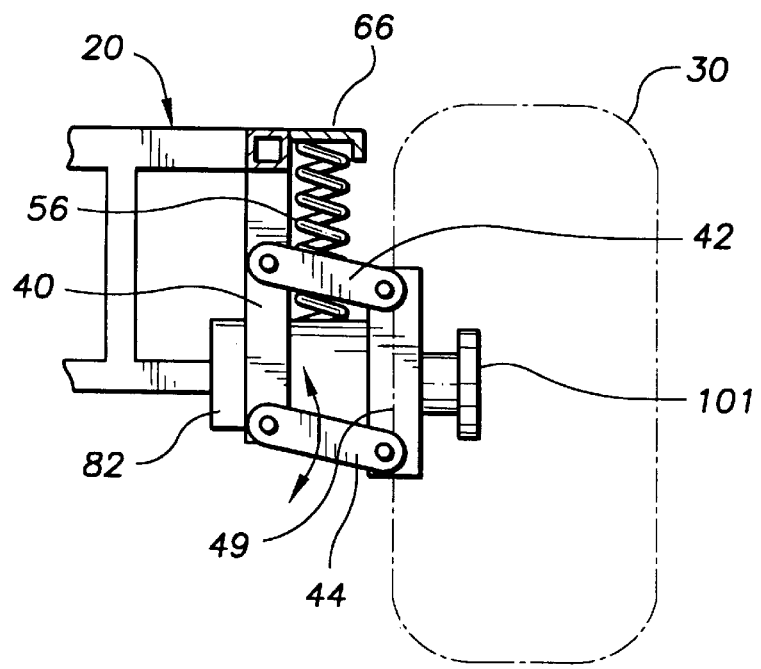
FIG. 2 is a part-sectional rearward looking elevation view taken along the line 2—2 of portions of the mower shown in FIG. 1, showing portions of the left rear drive wheel assembly and link type suspension system.

The mower has independent suspension systems for each of the rear drive wheels, as illustrated by typical FIG. 2. See also FIGS. 4 and 5. The wheel 30', shown in phantom, is mounted on a hub 101 which is mounted on the shaft of hydraulic motor 82. Motor 82 bolts to motor mount 49. The foregoing components comprise the wheel assembly. The wheel assembly is attached to the chassis by the suspension system which is comprised of a spaced apart pair of upper links 42, a like pair of lower links 44 and spring 56. The inner ends of the links are pivotably mounted on vertical struts 40 of the chassis. The outer ends of the links are pivotably mounted on the motor mount 49. Wire coil spring 56 is captured between spring bracket 66 attached to the chassis and the motor. Thus, the wheel assembly is adapted to move up and down vertically relative to the chassis, against and with, respectively, the force of the spring.

The cutter deck 24 is mounted beneath the chassis between the front and rear wheels of the mower. The cutter deck comprises a sheet metal housing enclosing one or more blades, rotatable about vertical axes, for cutting vegetation. The particular cutter deck of mower 18 is a floating deck. Familiar in the art, a floating cutter deck comprises a deck which hangs from the chassis by suspenders, in particular, chains, links, or other like means. The deck elevation is pre-set so it hangs under gravity force at an adjustable limit distance from the chassis, which distance determines the elevation at which the blades will cut vegetation when the mower is traversing a horizontal plane. The deck is vertically movable upwardly toward the chassis in response to a vertical force on the deck, as from ground contact or other lifting force.

Figure 3:
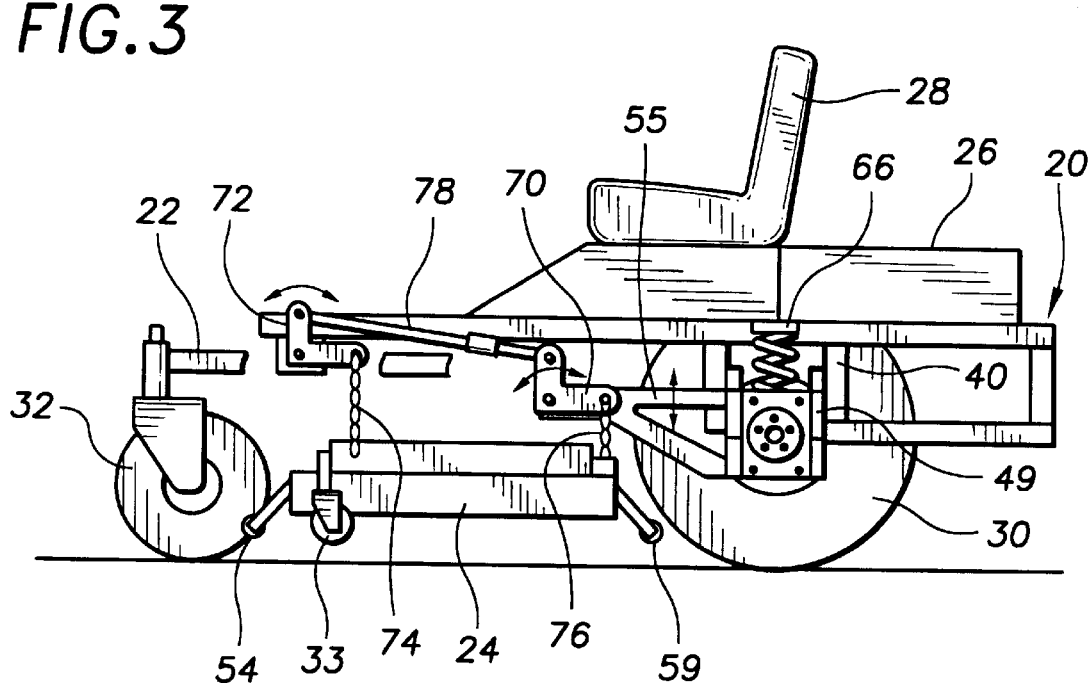
FIG. 3 is a side elevation partial cut-away view of mower having a cutter deck hanging from bell cranks, the rear ones of which are mounted on lifting brackets attached to the opposing side wheel assemblies.

Referring to FIG. 1 and 3, the cutter deck of the invention has adjustable wheels 33 on either side of the front end, a roller 54 at the front end, and a roller 59 at the rear end. The wheels and rollers are adapted to contact the surface being mowed as the mower passes over certain surface bumps and the like, and thereby exert a upward vertical force on the cutter deck.

Referring again to the rear wheels and associated suspension system described above, when the mower encounters a bump or depression during mowing, a rear wheel will rise or fall relative to the chassis. Looked at another way, the chassis will move closer or further from the local surface of the terrain. The combination of rear and front wheel suspension systems which has been just described allows the chassis to roll about the roll center of the chassis, as such center is determined from the mechanics of the the wheel assemblies and suspension system.

Figure 5:
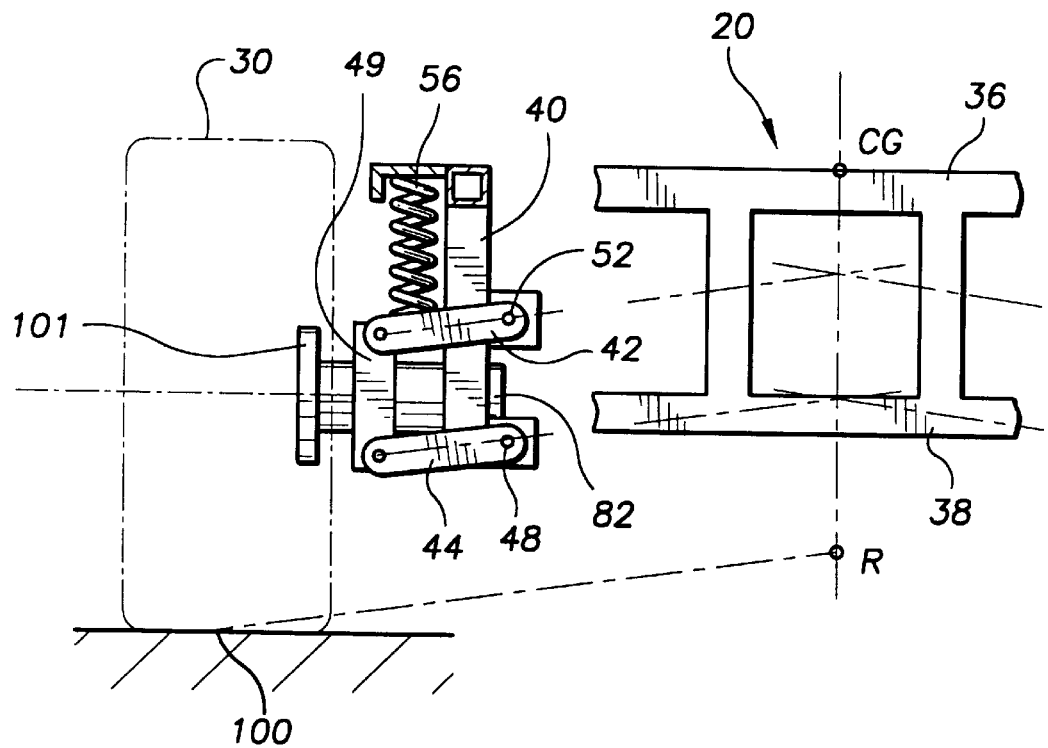
FIG. 5 is a part-sectional view from the rear of the mower of FIG. 1, showing the suspension shown in FIG. 2.
Figure 6:
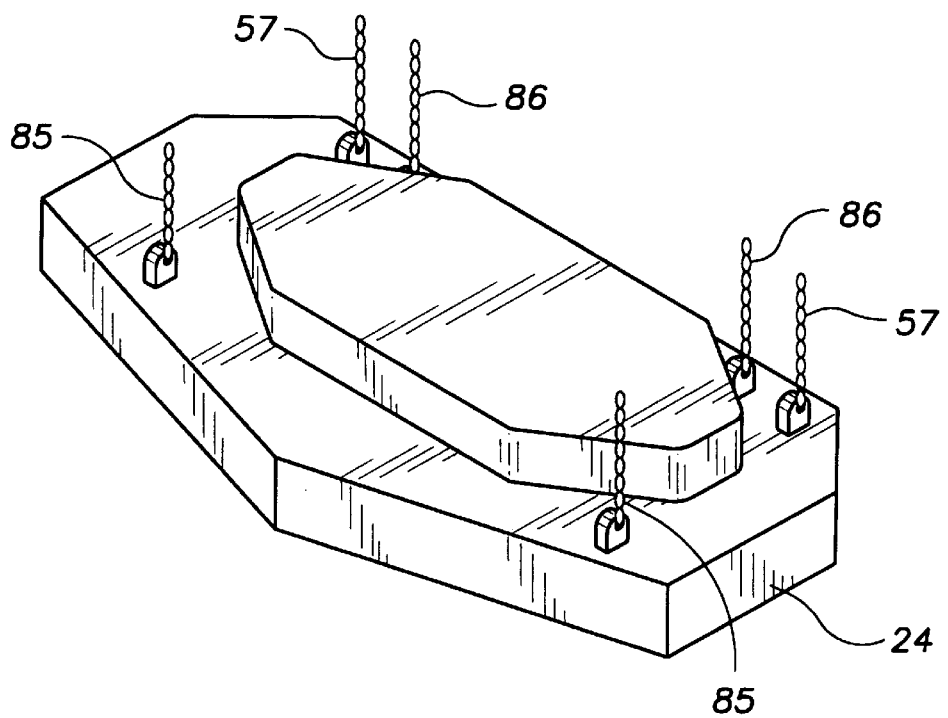
FIG. 6 is a perspective view of a deck supported by six chains, two of which connect to brackets mounted off wheel assemblies.
Figure 7:
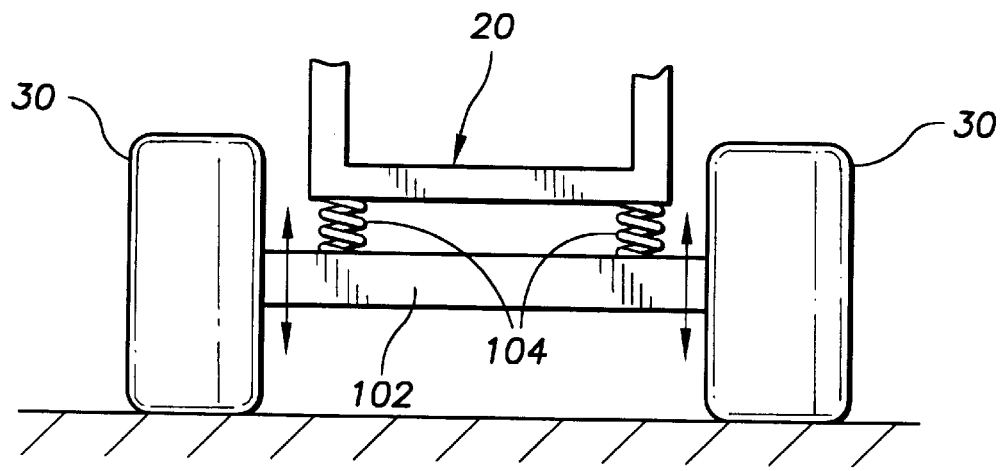
FIG. 7 is an elevation view from the rear of a mower showing a one-piece spring suspended axle.

The location of the roll center R for the rear wheel suspension system described above, where the upper and lower links of the wheel assemblies are of equal length, is illustrated in FIG. 5. It is substantially lower in elevation than the center of gravity (mass) CG of the machine. The roll center can be moved vertically by changing the lengths and angles of the link assemblies. The Description in aforementioned patent application Ser. No. 09/119,818 describes wheel assemblies, suspension systems, and roll centers, especially in relation to FIG. 5–8 thereof.

Rolling of a lawn mower chassis is induced under certain situations. Among them are: (a) when the mower changes direction while traveling forward, and centrifugal force acts laterally at the center of gravity of the machine; (b) when the mower traverses a slope, and the gravitational force vector shifts direction relative to the plane of the mower wheel tread; and, (c) when the mower travels over a surface undulation, lifting or lowering one or both wheels on one side, thereby rotating the mower chassis in space.

Most mowers use wheels that are rigidly connected to the chassis. Therefore, in those, the chassis cannot roll relative to the wheels and there is no rolling of the types (a) and (b) in the preceeding paragraph. Another class of mowers has a pivoting front or rear axle at one end, and an opposing-end axle rigidly attached to the chassis. In those, the rigidly attached axle may mostly limit the chassis roll which the pivoting axle otherwise permits, to the extent the chassis is sufficiently rigid. The independent rear wheel suspension system described for the mower 18 beneficially minimizes any rolling of the machine when a wheel passes over certain smaller bumps and depressions—type (c) rolling. The pivoting subframe at the front end similarly aids in avoiding such kind of rolling. Nonetheless, larger bumps and depressions can induce rolling.

And, because the roll center of mower 18, with the equal-length upper and lower links, is lower than the center of gravity, it is prone to rolling of types (a) and (b). If the cutter deck of the mower 18 was solely suspended from the chassis, rolling may adversely affect the essential mower function: cutting grass to an even height. In particular, when the chassis rolls and one chassis side moves closer to the earth surface, the suspended cutter deck also moves closer to the surface. The mower 18 is an example of but one mower construction and, as suggested above, rolling can and does occur in other types of mower constructions.

Thus, in the invention, the motion of the cutter deck is coupled to the motion of a spring suspended wheel relative to the chassis, to lessen change in elevation of the deck relative to the surface being mowed when the chassis rolls. When the chassis moves closer to the earth due to action of the suspension system, the deck is raised closer to the chassis, preferably directly proportionaly.

In one embodiment of the invention shown in FIG. 3, the left side of the deck 24 hangs by suspender chains 74, 76 attached at their upper ends to front bell crank 72 and rear bell crank 70, respectively. The angled bell cranks 70, 72 are pivotably mounted, and coupled in rotary motion by adjustable length rod 78, so rotation of a bell crank raises or lowers the deck. There is a corresponding set of bell cranks, chains and mechanism on the opposing right side of the mower. Typically, bell crank sets on each side are coupled to each other. Thus, the operator can simultaneously rotate all the bell cranks (by a cable or lever, or other common means, not shown), to select the predetermined or preset elevation at which the deck ordinarily hangs; and, to thus set the basic height to which grass will be cut. In a typical floating deck the predetermined elevation will be set so the deck wheels and rollers will be somewhat above the earth surface, as shown in FIG. 3. When a sufficiently high bump is encountered part or all of the deck will be thrust upwardly above the preset elevation by force exerted through contact with the earth of the wheels and rollers. One or more of the chains 74, 76 will be made slack.

As shown in FIG. 3, the front bell cranks 72 are pivotably mounted on the upper member of the chassis 20. On each side of the mower, rear bell crank 70 is mounted on a triangle shape lifting bracket 55 which is bolted to the motor mount 49 and thus becomes an integral part of the wheel assembly. Thus, when wheel 30 and motor mount 49 move vertically up relative to the chassis, the adjacent rear portion of the deck is likewise moved upward relative to the chassis, by force transmitted by suspender 76. If the rear bell cranks 70 were instead mounted on the chassis, as in the prior art, when a rear wheel moved upward, the deck would move closer to the earth and undesirably cut too close, or scalp, the earth surface.

In another embodiment of the invention, six suspenders act on the cutter deck. See FIG. 4 and 6. Four chains, two front chains 85 and two rear chains 86, suspend the deck in a conventional mode, using pivotable bell cranks for elevation adjustment, like the system described above. All four chains 85, 86 connect to bell cranks which are mounted on the chassis, and are called in this embodiment hanging suspenders. On each side of the mower, a lifting suspender, chain 57, connects the nearby rear deck portion to a lifting bracket 55 which is integral with the wheel mount 49 and wheel assembly. Thus, when a drive wheel moves upwardly, the chain 57 is tensioned and the rear corner portion of the deck is raised, making adjacent chain 86 slack. When the wheel moves down, the deck will fall under gravity if it is above its preset elevation. If the deck is at the preset elevation, or reaches it, and the wheel moves down, the chain 57 becomes slack, since the downward motion of the deck is limited by the chain 86. A bell crank or another common adjustment means may be employed for chain 57, so its length may be changed to accommodate different preset deck elevations.

Other suspenders can be substituted for chains, in flexibly hanging the deck from the chassis or connecting the deck to the wheel assembly. For instance, cables, slides, slotted links, and the like may be used. As used herein, the term suspender refers to an element which transmits tension force and negligible compression force. Since the deck is rigid, when a suspender lifts a portion of the deck to which it is attached, there are other effects. Typically, in the invention the deck has a width greater than its length; and likewise the side-to-side distances between suspenders is greater than the front-to-back distances. Thus, when the rear corner of a deck is lifted, the front corner on the same side will also be desirably lifted—compared to the undesired alternative of lifting the opposing side of the rear end of the deck.

Figure 4:
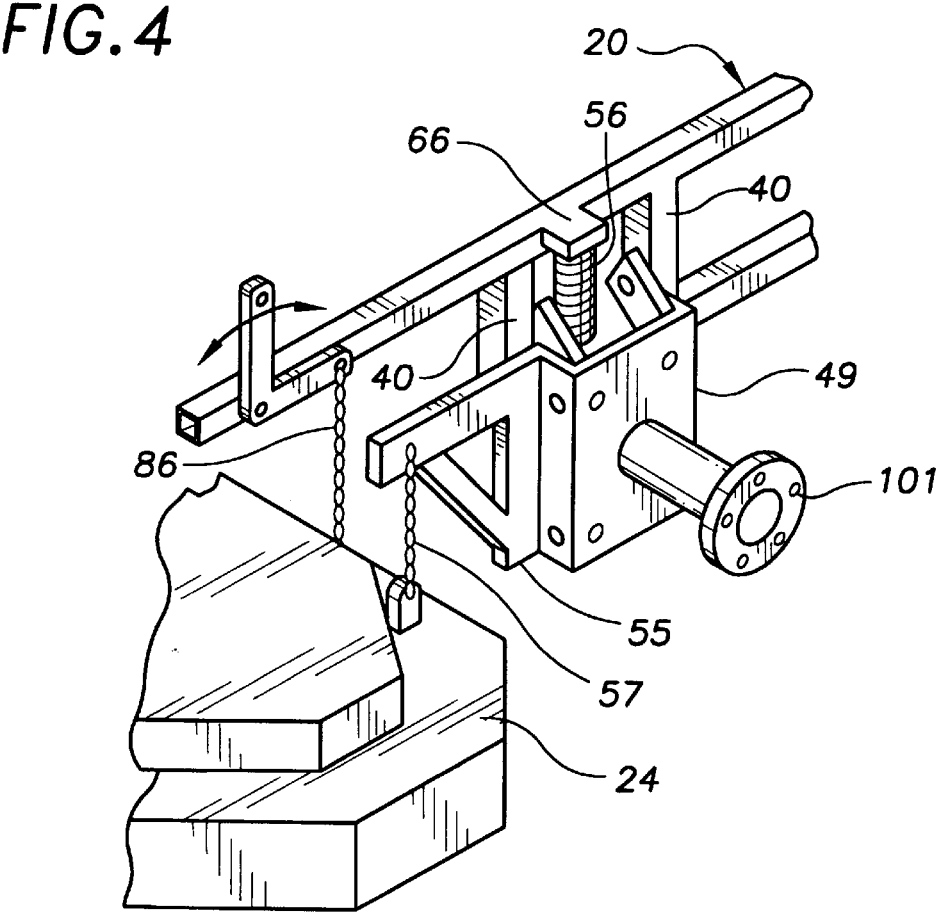
FIG. 4 is a perspective view of a portion of a mower, deck, wheel assembly, and suspension system, where a lifting bracket and chain lifts the rear part of the deck in response to upward wheel motion.
Figure 10:
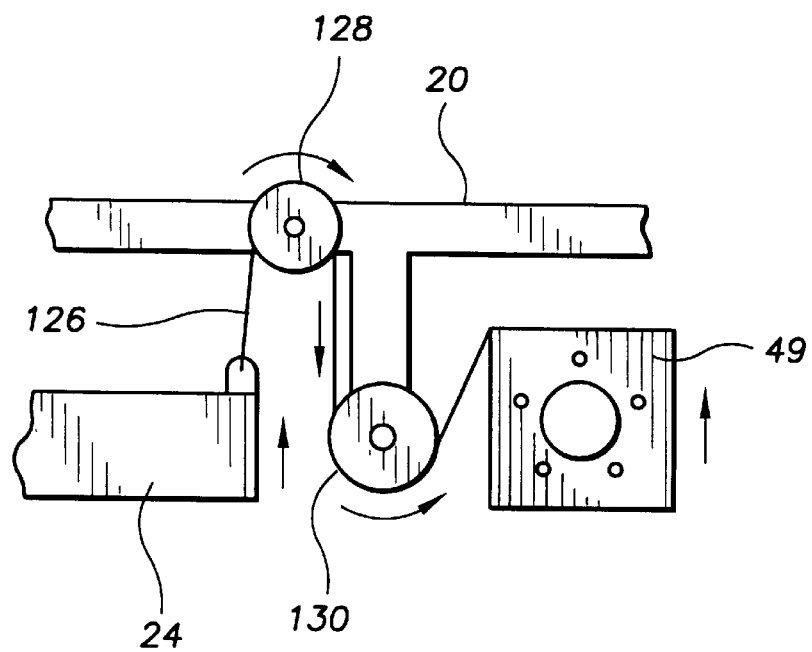
FIG. 10 is a side view of a fragment of a mower showing how a cutter deck is lifted by means of a cable connected to the motor mount of a wheel assembly.

In both the FIG. 3 and 4 embodiments, the lifting bracket becomes an integral part of the wheel assembly, simply extending its dimension conveniently forward so it is over the deck; so, the deck is essentially connected to the wheel assembly. While it is preferred to use the simple mechanical bracket and suspender shown in FIG. 4 and 6, other means may be employed for making the motion of a portion of the cutter deck respond in sense with the vertical movement of a wheel. For example, as illustrated by FIG. 10, a cable 126 runs from the motor bracket, around pulleys 130 and 128 (mounted on chassis 20) to the deck 24. As another example, an electromechanical displacement sensor is mounted on the chassis to sense wheel assembly upward motion and provide a signal to a control system, whereupon a hydraulic or electromechanical servomotor mounted on the chassis and connected to the deck is commanded by the control system to move the deck vertically up in response to the sensor signal. While the preferred practice of the invention is to use the simple direct connection between the wheel assembly and the cutter deck, so the lift of the deck is directly proportional to the wheel motion, non-proportional connections may be contemplated within the embodiment variations just mentioned.

The present invention also will be useful with other mowers having different wheel assembly and spring suspension systems from the preferred independent suspension mower 18 embodiment. For example, as illustrated by the rear-end view of FIG. 7, a mower has a one-piece beam, or rigid, rear axle 102 (which axle can comprise drive train components, such as is the case with a transaxle) at the ends of which there are hubs on which wheels 30 mount. The axle is suspended from the chassis 20 by springs 104 at opposing ends of the axle. Arms and other link type mechanism which keep the axle in axial and lateral position beneath the chassis are omitted for simplicity. Leaf springs may be substituted for the coil springs shown. And, a single spring running transversely, or along the axle length, may be substituted for the individual springs. In the FIG. 7 embodiment, wheels 30 are each spring suspended and go up and down relative to the chassis when the mower encounters undulations. The chassis is able to roll in the same manner as described above for mower 18, assuming a rigid front end axle which does not prevent such. Therefore, in the FIG. 7 embodiment, the cutter deck will be mounted beneath the mower in a similar fashion to that described above for mower 18, so the rear portions of the deck are linked to the outer ends of the axle, and so upward motion of a wheel relative to the chassis modulates the elevation of the adjacent portion of the deck.

Figure 8:
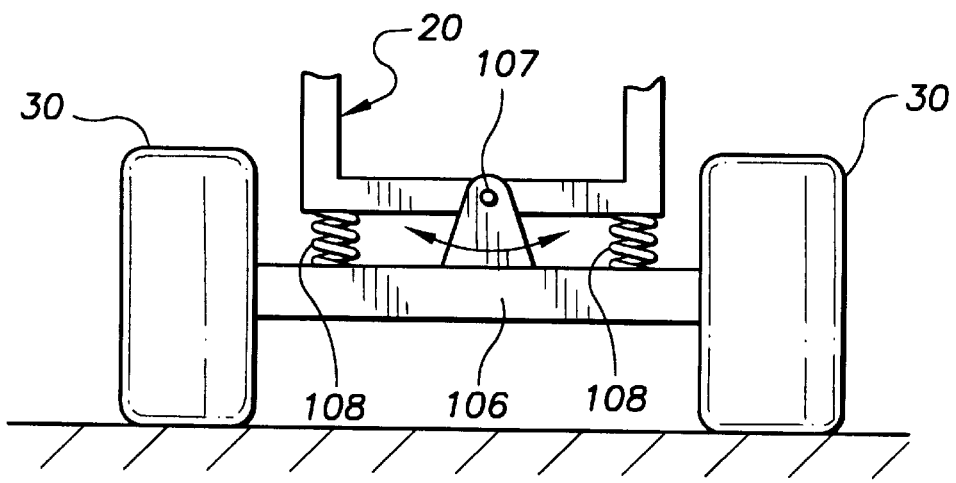
FIG. 8 is an elevation view from the rear of a mower, like FIG. 7, showing a pivoting one-piece axle with spring-centering.

In another example, the wheels are attached to the outer ends of a center-pivotable rigid rear axle, as shown in FIG. 8. Similarly to the pivotable front axle previously described, the FIG. 8 axle 106 (which may be a transaxle) mounts at pivot point 107 on chassis 20. Coil springs 108 at either end resist pivoting motion and "self-center" the axle to its rest position. The chassis of the FIG. 8 mower is able to roll, again assuming the opposing end axle and chassis stiffness permit. The invention is applied in the same manner as discussed, for FIG. 7 and generally above.

The preferred embodiment has been described in terms of a mower which has rear drive wheels, but the invention is equally well applied to a mower which has front drive wheels, and to mowers where the cutter deck is mounted outwardly from the front or rear of the mower. The invention can also be applied to mowing machines where the cutter deck is in part "ground following" rather than "floating"; that is, where one end, typically the front end, of the deck has wheels which are constantly in contact with the lawn being mowed, so the deck front end goes up and down with the up and down of the terrain.

Figure 9:
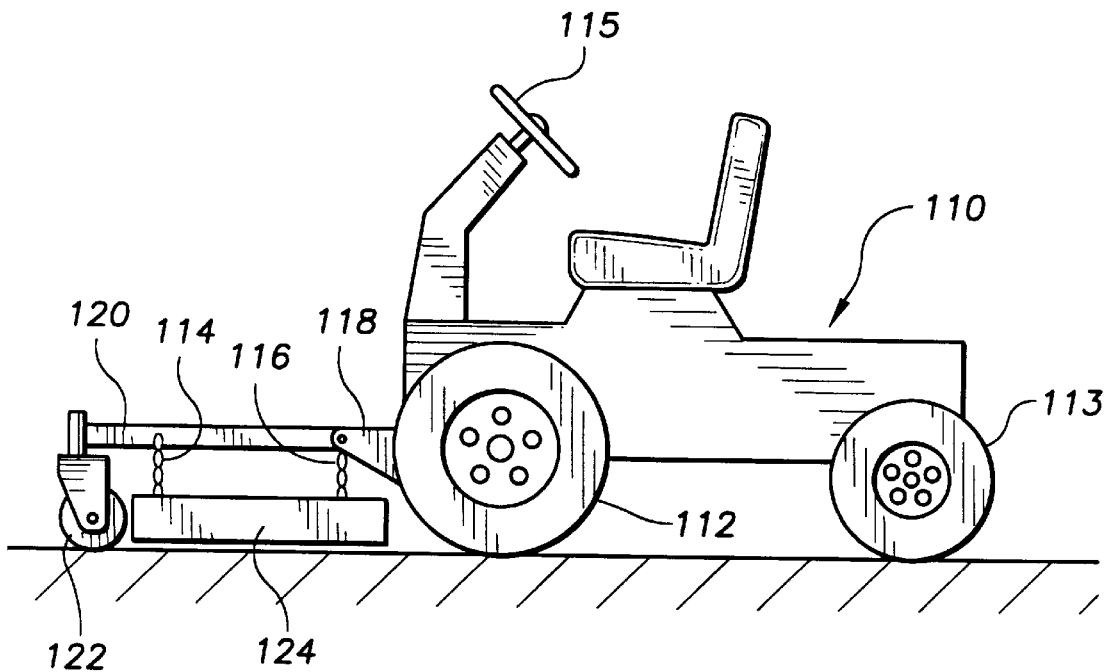
FIG. 9 is a side elevation view of a front wheel drive mower having a deck cantilever-mounted from the front of the mower.

FIG. 9 shows a mower 110 having such features. Drive wheels 112 at the front end of the mower are spring suspended in one of the several ways described above. Preferably they are independently suspended like rear wheels of mower 18, and are driven through a differential type drive system. The unpowered rear wheels 113 are steerable through steering wheel 115 by the operator. The cutter deck 124 is suspended by four chains 114 and 116 beneath subframe 120 which pivotably cantilevers from the front end of the mower. For simplicity, the bell crank system which customarily is employed for presetting the vertical elevation is omitted from the drawings. The subframe 120 has freely pivotable caster wheels 122 at the front end. Front chains 114 connect the cutter deck front end to the subframe. Thus, the front end of subframe and deck rise and fall as the wheels 122 rise and fall due to uneven terrain. The rear end of the subframe rises and falls with the motion of the chassis. Therefore, a lifting bracket 118 mounts off the spring-suspended wheel assembly on each side of the mower; and, chains 116 connect the rear end of the deck to the brackets, to thereby induce the desired motion in the deck characteristic of the invention.

Generally, the invention is described in terms the wheels, which are spring suspended for up and down motion relative to the chassis, being drive wheels. The invention will also be applied to mowers where the spring suspended wheels are non-drive wheels. In a mower where all the front and rear wheels are spring suspended for vertical motion, the invention may be applied so both the front and rear portions of the deck are respectively connected to the front and rear wheel assemblies. While coil springs have been mostly described, torsion bars and other resilient devices (e.g., air bags, air cylinders, etc.) may be used instead of coil springs. While mowers having four wheels, spaced apart at front and rear have been described, the invention can be applied to machines which have essentially a tricycle arrangement. It will be understood that (dual or more) wheels may be may be used where single wheels have been referred to. The invention may be applied to mowing machines where the operator is not riding atop the mower, but is walking or riding behind the mower.

Although only the preferred embodiment has been described with some alternatives, it will be understood that further changes in form and detail may be made without departing from the spirit and scope of the claimed invention.

I claim:

1. A lawn mower comprising:
   a chassis having a first end and a second end;
   first and second first wheel assemblies, on opposing sides of the first end of the chassis, for supporting the mower on a lawn surface; each wheel assembly comprised of a wheel; each wheel assembly spring suspended from the chassis for movement up and down relative to the chassis;
   two second end wheels mounted at the second end of the chassis, for supporting the mower on the lawn surface;
   a cutter deck having a first end and second end, each corresponding in orientation with the ends of the chassis, one cutter deck end suspended from the chassis;
   a plurality of suspenders for suspending the cutter deck at a predetermined elevation relative to the chassis, wherein a portion of the cutter deck is vertically movable upward in response to an upward force, and wherein the cutter deck is vertically movable downward to said predetermined elevation under force of gravity; and
   at least one of the suspenders connected to the second first wheel assembly wherein a position of the cutter deck is responsive to movement of a portion of the second first wheel assembly.

2. The lawn mower of claim 1 further comprising first and second lifting brackets attached to the first and second first wheel assemblies, respectively; the at least one of the suspenders connecting said deck portion and the second lifting bracket.

3. The lawn mower of claim 1 wherein the first end and second end are respectively the rear end and front end of the lawn mower; and, wherein said first wheel assemblies are drive wheels.

4. The lawn mower of claim 3 wherein the drive wheels of the first wheel assemblies are spring suspended from the chassis, each independently of the other.

5. The lawn mower of claim 4 wherein a roll center of the mower in the vicinity of the first end is lower than a center of gravity of the mower.

6. The lawn mower of claim 1 further comprising two second end wheel assemblies on opposing sides of the second end of the mower; each second end wheel assembly comprised of one of said second end wheels; each second end wheel assembly spring suspended from the chassis for movement up and down relative to the chassis.

7. The lawn mower of claim 6 wherein the cutter deck is suspended from the chassis; wherein each of said four wheel assemblies is connected with a respective proximate portion of the cutter deck by separate ones of said plurality of suspenders.

8. The lawn mower of claim 6 comprising a transverse second end member, pivotably mounted at the second end of the chassis, the second end wheels mounted at the opposing ends of the member.

9. A lawn mower comprising a chassis having a rear end and a front end;

two front wheel assemblies, on opposing sides of the chassis, for supporting and propelling the mower on a lawn surface; each wheel assembly comprised of a front wheel; each front wheel assembly spring suspended from the chassis for movement up and down relative to the chassis;

two steerable rear wheels, on opposing sides of the rear end of the chassis, for supporting and controlling the travel direction of the mower on a lawn surface;

a subframe having a front end and a rear end, extending from the front end of the lawn mower, the rear end pivotably attached to the front end of the chassis, the front end having wheels for supporting the subframe on the lawn surface; and, a cutter deck having a front end and a rear end, mounted beneath the subframe, the front end of the cutter deck suspended from the subframe; the opposing sides of the rear end of the cutter deck suspended from the respective opposing front wheel assemblies; the cutter deck suspended by a plurality of suspenders which enable the cutter deck to be set at a predetermined elevation relative to the chassis, and which enable cutter deck upward movement in response to an upward force on the cutter deck; at least one of the suspenders being connected to at least one of the front wheel assemblies wherein, when the at least one of the front wheel assemblies moves vertically upward, an adjacent portion of the cutter deck is lifted vertically upward.

10. In a lawn mower of the type having a set of opposing wheel assemblies at one end thereof, wherein portions of the wheel assemblies are vertically movable relative to a chassis of the mower during use, and wherein a cutter deck is at least in part suspended from the chassis by means which enables upward motion of the cutter deck in response to an upward force on the cutter deck, the improvement which comprises: a plurality of suspenders connecting opposing portions of the cutter deck to respective portions of each of the opposing wheel assemblies, so that upward movement one of the assembly causes upward motion of the cutter deck, to thereby reduce the tendency of the cutter deck to come into contact with a surface being mowed.

* * * * *